US008561660B2

(12) United States Patent
Ohashi et al.

(10) Patent No.: US 8,561,660 B2
(45) Date of Patent: Oct. 22, 2013

(54) PNEUMATIC TIRE

(75) Inventors: Toshiyuki Ohashi, Osaka (JP); Kazuo Shimomura, Osaka (JP)

(73) Assignee: Toyo Tire & Rubber Co., Ltd., Osaka (JP)

( * ) Notice: Subject to any disclaimer, the term of this patent is extended or adjusted under 35 U.S.C. 154(b) by 370 days.

(21) Appl. No.: 13/150,766

(22) Filed: Jun. 1, 2011

(65) Prior Publication Data
US 2011/0290392 A1 Dec. 1, 2011

(30) Foreign Application Priority Data
Jun. 1, 2010 (JP) ................................ 2010-125959

(51) Int. Cl.
*B60C 11/12* (2006.01)

(52) U.S. Cl.
USPC ............. 152/209.18; 152/209.21; 152/DIG. 3

(58) Field of Classification Search
CPC ............ B60C 11/1204; B60C 11/1218; B60C 11/1227; B60C 11/1281; B60C 2011/1209; B60C 2011/1213
USPC ............................ 152/209.18, 209.21, DIG. 3
See application file for complete search history.

(56) References Cited

U.S. PATENT DOCUMENTS

| | | | |
|---|---|---|---|
| 6,315,018 B1 | 11/2001 | Watanabe | |
| 2003/0101851 A1 * | 6/2003 | Domange et al. | ............ 76/101.1 |
| 2006/0016537 A1 | 1/2006 | Kuroda | |
| 2006/0037683 A1 | 2/2006 | Cuny et al. | |
| 2007/0272337 A1 | 11/2007 | Bovaird et al. | |
| 2009/0050248 A1 | 2/2009 | Ohashi | |

FOREIGN PATENT DOCUMENTS

| | | | |
|---|---|---|---|
| EP | 1616721 | * | 1/2006 |
| JP | 2-200503 | * | 8/1990 |
| JP | 9-272312 | * | 10/1997 |
| JP | 10-029412 | A | 3/1998 |
| JP | 11-048721 | A | 2/1999 |
| JP | 11-151913 | A | 6/1999 |
| JP | 2000-102925 | * | 4/2000 |
| JP | 2000-211320 | * | 8/2000 |
| JP | 2007-314168 | A | 12/2001 |
| JP | 2004-161166 | A | 6/2004 |
| JP | 2005-247105 | A | 9/2005 |
| JP | 2006-036102 | A | 2/2006 |
| JP | 2006-056502 | A | 3/2006 |
| JP | 2009-051309 | A | 3/2009 |

* cited by examiner

*Primary Examiner* — Steven D Maki
*Assistant Examiner* — Robert Dye
(74) *Attorney, Agent, or Firm* — Westerman, Hattori, Daniels & Adrian, LLP

(57) ABSTRACT

A sipe extending in a tire width direction is provided in a land part (block) of a tread shoulder region, and the sipe is configured to include a first sipe part, a second sipe part having a groove width larger than the first sipe part and a third sipe part larger than the second sipe part. The first sipe part is formed over the whole of a sipe length direction in an opening side region of the sipe and the whole of a sipe depth direction in an inner region on the side of a tire equator; the third sipe part is formed in an outer region on the side of a tread ground contact end in a sipe bottom part region; and the second sipe part is formed in a region between the first sipe part and the third sipe part.

7 Claims, 5 Drawing Sheets

COMPARATIVE EXAMPLE 1

COMPARATIVE EXAMPLE 2

COMPARATIVE EXAMPLE 3

PNEUMATIC TIRE

CROSS-REFERENCE TO RELATED APPLICATIONS

This application is based upon and claims the benefit of priority from the prior Japanese Patent Application No. 2010-125959, filed on Jun. 1, 2010; the entire contents of which are incorporated herein by reference.

BACKGROUND OF THE INVENTION

1. Field of the Invention

The present invention relates to a pneumatic tire, and in particular, it relates to a pneumatic tire in which a sipe is formed in a land part of a tread surface.

2. Description of the Related Art

Conventionally, in tires in which a sipe is formed in a land part of a tread surface, there have been proposed various sipe configurations for the purposes of enhancing drainage properties and enhancing a wear performance.

For example, JP-A-2006-36102 discloses a sipe configuration in which a wide part for enlarging a groove width from a central part to a bottom part in a depth direction of the sipe is provided, and the wide part is terminated in a position coming inward from the both end parts of the sipe. According to this, for example, in studless tires, adequate collapse of a land part is generated from the beginning of wear to the end of wear, thereby exerting a good edge effect.

JP-A-2005-247105 discloses a sipe configuration in which not only a first wide part extending from a tread surface and terminating on the halfway to a sipe bottom part is provided in a part in a sipe length direction, but a second wide part extending from a position on the way of a sipe depth direction toward the sipe bottom part in a different position in the sipe length direction. According to this, for example, in studless tires, closing of the sipe is suppressed, and an edge effect and a drainage effect are secured.

JP-A-2009-51309 discloses a sipe configuration in which plural wide parts extending over the whole of a sipe length direction are stacked and provided in a sipe depth direction such that the width becomes wider in the sipe depth direction. According to this, for example, in studless tires, the sipe width becomes large with the progress of wear, thereby lowering the rigidity of a land part, so that an edge effect and a water removing effect are secured.

JP-A-11-151913 discloses a configuration in which not only sipes are formed in a narrow groove part on the side of a tread surface and in a thick groove part on the side of a bottom part, but a boundary line therebetween is inclined in a sipe length direction. According to this, it is described that a lowering of a wet performance is suppressed while suppressing an increase of a noise performance to the end of wear.

SUMMARY OF THE INVENTION

Now, in pneumatic tires, in general, there is taken ground contact pressure distribution in which at the time of running, especially at the time of braking, the ground contact pressure is locally raised in a shoulder region of a tread, in particular, on the ground contact end side within a shoulder region. When the ground contact pressure within a ground contact plane becomes non-uniform due to such a local rise of the ground contact pressure, it may be considered that a braking performance and a wear performance are adversely affected. However, according to the foregoing conventional sipe configurations, such a local rise of the ground contact pressure on the ground contact end side within a shoulder region could not be suppressed.

In view of the foregoing circumstances, an object is to provide a pneumatic tire capable of enhancing a braking performance and a wear performance by suppressing a local rise of the ground contact pressure on the ground contact end side within a shoulder region from the beginning of wear to the end of wear.

According to an aspect of the invention, a pneumatic tire includes a sipe extending in a tire width direction provided in a land part located in a shoulder region of a tread part, wherein the sipe comprises:

a first sipe part formed over the whole of a sipe length direction in a region on the opening side in a sipe depth direction and also formed over the whole of the sipe depth direction in an inner region on the tire equator side in the sipe length direction and having a first groove width;

a third sipe part formed in a bottom part region in the sipe depth direction in an outer region on the tread ground contact end side in the sipe length direction and having a third groove width wider than the first groove width; and a second sipe part formed in a region between the first sipe part and the third sipe part and having a second groove width wider than the first groove width and narrower than the third groove width.

DETAILED DESCRIPTION OF THE PREFERRED EMBODIMENTS

Embodiments of the invention are hereunder described by reference to the accompanying drawings.

First Embodiment

Though illustration is omitted, a pneumatic tire according to First Embodiment is configured to include a left-and-right pair of a bead part and a sidewall part and a tread part 10 provided between the both sidewall parts so as to connect radial-direction external end parts of the left-and-right sidewall parts to each other. The tire includes a carcass extending over the pair of bead parts. The carcass is composed of at least one carcass ply which extends from the tread part 10 to the sidewall parts and both end parts of which are engaged with an annular bead core embedded in the bead parts, and reinforces each of the foregoing parts. A belt composed of two or more rubber-coated steel code layers is provided on the peripheral side of the carcass in the tread part 10 and reinforces the tread part 10 in the periphery of the carcass.

Figure 1:
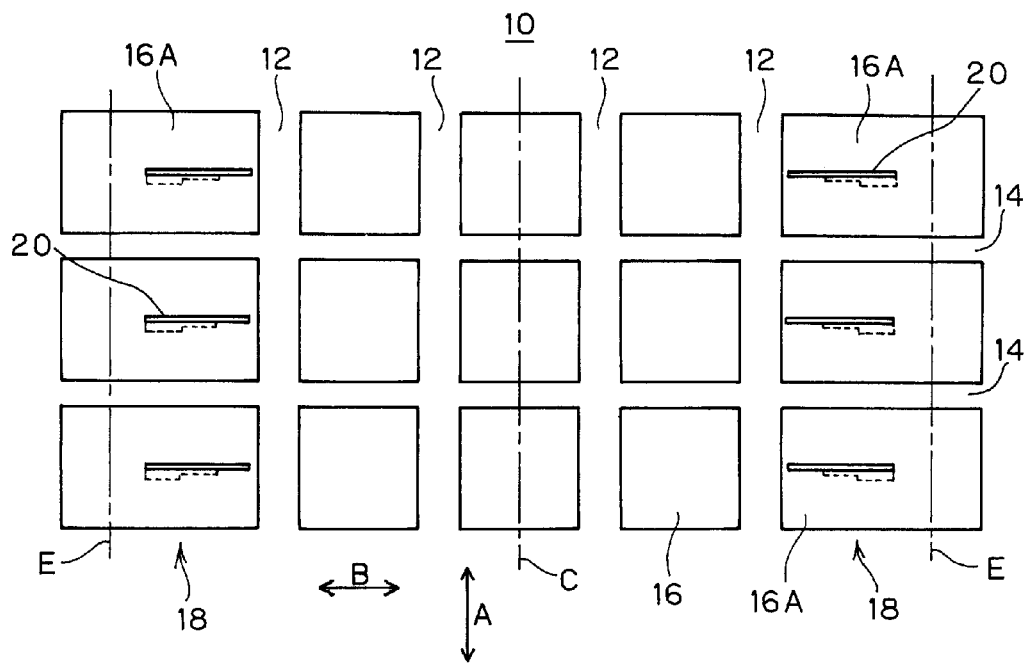
FIG. 1 is a development of a tread pattern of a tire according to First Embodiment.
Figure 2:
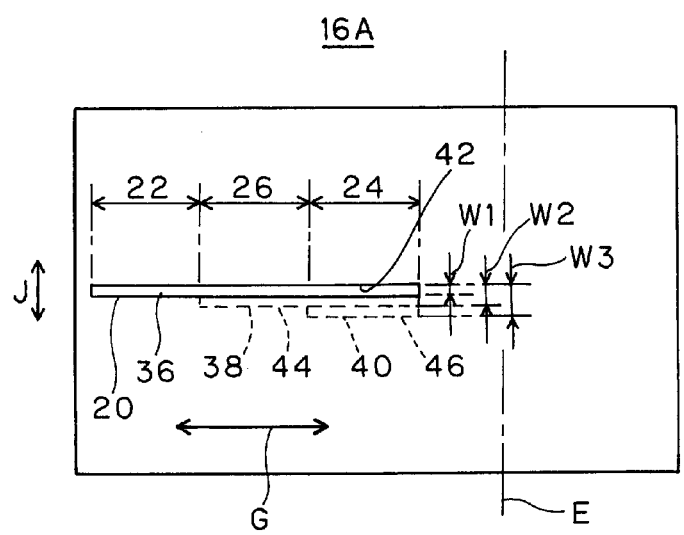
FIG. 2 is a plan view of a block according to First Embodiment.

As shown in FIG. 1, the tread part 10 is provided with plural longitudinal grooves (main grooves) 12 extending in a straight line in a tire circumferential direction A and plural transverse grooves 14 intersecting with the longitudinal grooves 12 and also provided with plural blocks 16 which are divided by the longitudinal grooves 12 and the transverse grooves 14. According to this exemplary embodiment, four longitudinal grooves 12 are provided in a tire width direction B, whereby five block rows are arranged in the tire width direction B. Among them, regions in the both end parts in the tire width direction B are a shoulder region 18. Incidentally, in FIG. 1, a symbol C stands for a tire equator, and a symbol E stands for a tread ground contact end.

A block 16A (hereinafter also referred to as a "shoulder block") that is a land part provided in the shoulder region 18 is provided with a sipe 20 extending in the tire width direction B. In this exemplary embodiment, the sipe 20 is a cut, the both ends of which are not opened against a block edge (namely, a cut terminating within the block without being opened against the longitudinal groove 12, and this cut is also called a "closed sipe"). The sipe 20 extends in a straight line along the tire width direction B, and every one sipe 20 is provided in each of the blocks 16A.

A configuration of the sipe 20 is described in detail on the basis of FIGS. 2, 3 and 4A to 4C. The sipe 20 is divided into three regions in its length direction G, in which a region on the side of the tire equator C is defined as an inner region 22, a region on the side of the tire ground contact end E is defined as an outer region 24, and a region between the inner region 22 and the outer region 24 is defined as a central region 26. Also, the sipe 20 is divided into three regions in its depth direction H, in which a region on the side of a tread surface 28 is defined as an opening side region 30, a region on the side of the sipe bottom part is defined as a bottom part region 32, and a region between the opening side region 30 and the bottom part region 32 is defined as a central depth region 34.

When the respective regions of the length direction G and the depth direction H are defined in this way, the sipe 20 is composed of a first sipe part 36 formed over the whole of the length direction G in the opening side region 30 and the whole of the depth direction H in the inner region 22; a second sipe part 38 formed in the central region 26 and the outer region 24 of the length direction G in the central depth region 34 and in the central region 26 of the length direction G in the bottom part region 32; and a third sipe part 40 formed in the outer region 24 of the length direction G in the bottom part region 32.

Figure 3:
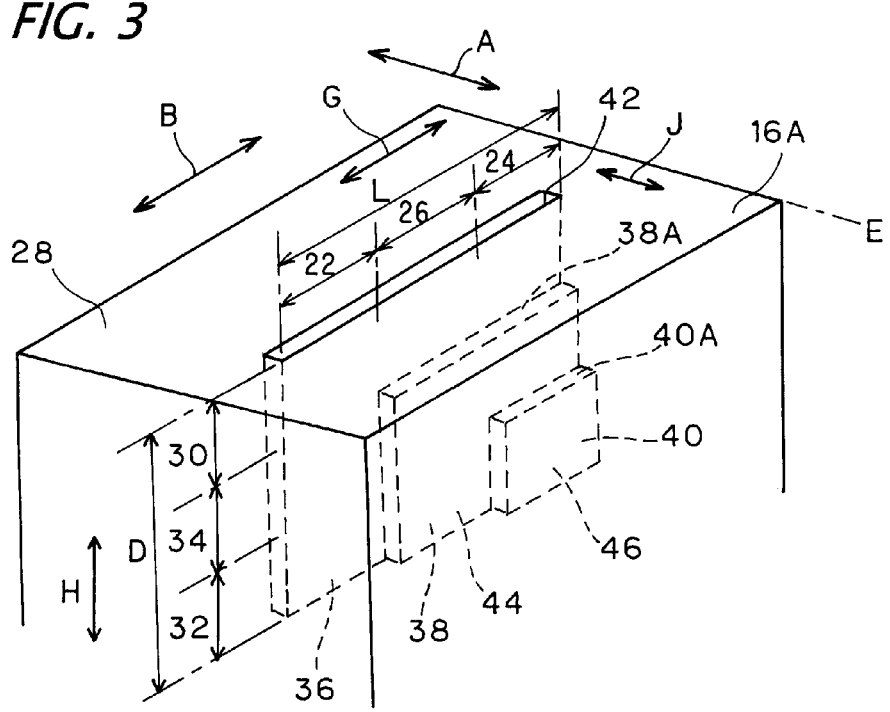
FIG. 3 is a perspective view of a block according to First Embodiment.

In detail, as shown in FIG. 3, in the sipe bottom part in an outer end part of the tire width direction B of the sipe 20, the third sipe part 40 has a rectangular shape as seen from a sipe width direction J, and an upper end part 40A is formed in a straight line in parallel to the tread surface 28. The second sipe part 38 is a sipe part formed in a region between the first sipe part 36 and the third sipe part 40. The second sipe part 38 is provided adjacent to the side of the tire equator C and the side of a sipe opening 42 of the third sipe part 40 and formed in an L shape as seen from a sipe width direction J. An upper end part 38A of the second sipe part 38 is also formed in a straight line in parallel to the tread surface 28. The first sipe part 36 is provided adjacent to the side of the tire equator C and the side of the sipe opening 42 of the second sipe part 38 and formed in an L shape as seen from the sipe width direction J.

As for groove widths (sipe widths) of these first to third sipe parts 36, 38 and 40, a groove width (second groove width) W2 of the second sipe part 38 is set wider than a groove width (first groove width) W1 of the first sipe part 36, and a groove width (third groove width) W3 of the third sipe part 40 is set wider than the groove width W2 of the second sipe part 38 (namely, W1<W2<W3).

In this exemplary embodiment, the second sipe part 38 is formed so as to have a groove width larger than the first sipe part 36 by a first wide part 44 projecting toward one side of the sipe width direction J relative to the first sipe part 36, namely W2>W1. Also, the third sipe part 40 is formed so as to have a groove width larger than the second sipe part 38 by a second wide part 46 projecting toward the same side as the first wide part 44 relative to the second sipe part 38, namely W3>W2. As shown in FIG. 3, in this exemplary embodiment, each of the first wide part 44 and the second wide part 46 has a rectangular shape as seen from the sipe width direction J and is formed in such a shape that the second wide part 46 is stacked on the first wide part 44.

Though respective dimensions of the sipe 20 are not particularly limited, it is preferably set in the following manner. That is, in the sipe length direction G, a width of each of the regions 22, 24 and 26 specifying a length of each of the sipe parts 36, 38 and 40 is preferably from 20 to 40% relative to a full length L of the sipe 20 (namely, inner region 22=from 0.2 L to 0.4 L, central region 26=from 0.2 L to 0.4 L, outer region 24=from 0.2 L to 0.4 L). It is more preferable to divide the full length L of the sipe 20 into three equal parts.

Also, in the sipe depth direction H, a depth of each of the regions 30, 32 and 34 specifying the position of each of the upper end parts 38A and 40A of the second sipe part 38 and the third sipe part 40 is preferably from 20 to 40% relative to a depth D of the sipe 20 (namely, opening side region 30=from 0.2 D to 0.4 D, central depth region 34=from 0.2 D to 0.4 D, bottom part region 32=from 0.2 D to 0.4 D). It is more preferable to divide the depth D of the sipe 20 into three equal parts. Incidentally, the depth D of the sipe 20 is preferably from 50 to 90% of a depth of the longitudinal groove 12.

As for the groove width of the sipe 20, the groove width W1 of the first sipe part 36 is preferably from 0.2 to 0.6 mm. The groove width W2 of the second sipe part 38 is larger than the first groove width W1 preferably by 0.1 mm or more, and more preferably by 0.2 mm or more. Similarly, the groove width W3 of the third sipe part 40 is larger than the second groove width W2 preferably by 0.1 mm or more, and more preferably 0.2 mm or more. An upper limit of the groove width W3 of the third sipe part 40 is preferably not more than 1.8 mm.

Figure 4A:
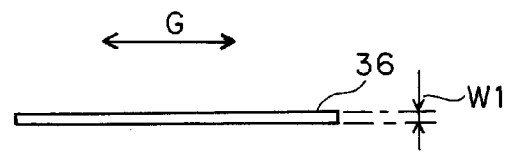
FIGS. 4A to 4C are each a sectional view of a sipe according to First Embodiment in each of wear stages.

As shown in FIG. 4A, in the thus configured sipe 20, the whole of the sipe length direction G is composed of the first sipe part 36 at the beginning of wear (this state will be referred to as a "first wear stage"). In this first wear stage, the opening shape of the sipe 20 is constant over the while of the length direction G and has the narrow groove width W1. However, since the second sipe part 38 and the third sipe part 40 having a large groove width are provided on the bottom part side of the sipe 20 while being displaced on the side of the tread ground contact end E, the rigidity of the shoulder block 16A is low on the side of the tread ground contact end E. For that reason, the ground contact pressure can be decreased in a portion on the side of the tread ground contact end E where the ground contact pressure is easily raised at the time of braking, whereby the ground contact properties are uniformized.

Figure 4B:
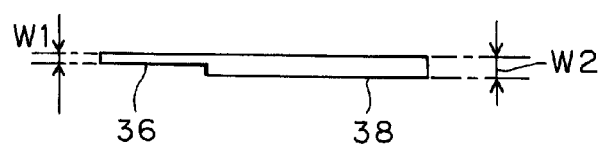

As shown in FIG. 4B, in the middle period of wear (for example, in a stage where the tire wears to an extent of from 30 to 50%), the second sipe part 38 appears on the ground contact surface (this state will be referred to as a "second wear stage"). According to this, as for the opening shape of the sipe 20, in the length direction G, the groove width W2 in the outer region 24 and the central region 26 becomes larger than the groove width W1 in the inner region 22.

Figure 4C:
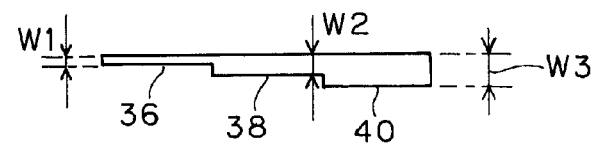

Furthermore, as shown in FIG. 4C, at the end of wear (for example, in a stage where the tire wears to an extent of 60% or more), in addition to the second sipe part 38, the third sipe part 40 also appears on the ground contact surface (this state will be referred to as a "third wear stage"). According to this, as for the opening shape of the sipe 20, in the length direction G, not only the groove width W3 in the outer region 24 becomes larger than the groove width W2 in the central region 26, but the groove width W2 in the central region 26 becomes larger than the groove width W1 in the inner region 22.

As described above, since the groove width of the sipe 20 is set in such a manner that it becomes larger toward the side of the tread ground contact end E where the ground contact pressure is easily raised at the time of braking, the rigidity in the portion on the side of the tread ground contact end E can be locally decreased, thereby reducing the ground contact pressure. In particular, as for the block 16A, its height becomes low with the progress of wear, whereby the rigidity is raised. However, by allowing the second and third sipe parts 38 and 40 contributing to a lowering of the rigidity to appear with the progress of wear, a local rise of the ground contact pressure in the portion on the side of the tread ground contact end E can be more effectively suppressed.

According to the foregoing pneumatic tire of this embodiment, the local rise of the ground contact pressure on the side of the ground contact end E of the shoulder block 16A can be suppressed from the beginning of wear to the end of wear, and the ground contact properties at the time of normal running, especially at the time of braking can be uniformized. Therefore, a braking performance and a wear performance of the tire can be enhanced.

Incidentally, if the sipe is set so as to have such a fixed sectional shape that the groove width becomes larger toward the tread ground contact end side over the whole of the depth direction, the rigidity of the block becomes excessively small in the stage at the beginning of wear, whereby it becomes difficult to contrive to uniformize the ground contact pressure from the beginning of wear to the end of wear. For that reason, as described previously, the second and third sipe parts 38 and 40 are allowed to appear with the progress of wear.

According to this embodiment, at the time of wear, especially at the end of wear when a groove volume of the longitudinal groove 12 or the transverse groove 14 is small and the drainage properties are lowered due to these grooves 12 and 14, the groove width of the sipe 20 is set so as to become gradually large toward the outer region 24 in the length direction G. For that reason, water which has invaded the sipe 20 can be smoothly guided from the inner region 22 toward the outer region 24 and can be removed out from the outer region 24, so that a lowering of the drainage properties can be suppressed. In view of this fact, in cooperation with the uniformization of the ground contact pressure, an excellent braking performance (wet braking performance) on a wet road surface is exerted.

Also, as shown in FIGS. 4A to 4C, the sipe 20 can be utilized as a wear indicator for discriminating the wear process because the opening shape changes with the progress of wear. In particular, according to this embodiment, the second sipe part 38 is formed of the first wide part 44 projecting toward one side of the sipe width direction J relative to the first sipe part 36, and the third sipe part 40 is formed of the second wide part 46 projecting toward the same side as the first wide part 44 relative to the second sipe 38, and therefore, the shape of a difference in level of the boundary between the respective sipe parts is easily distinguished. In particular, in this exemplary embodiment, as shown in FIGS. 4A to 4C, the sipe opening shape changes stepwise with the progress of wear, and excellent distinguishing properties are revealed.

Second Embodiment

Figure 5:
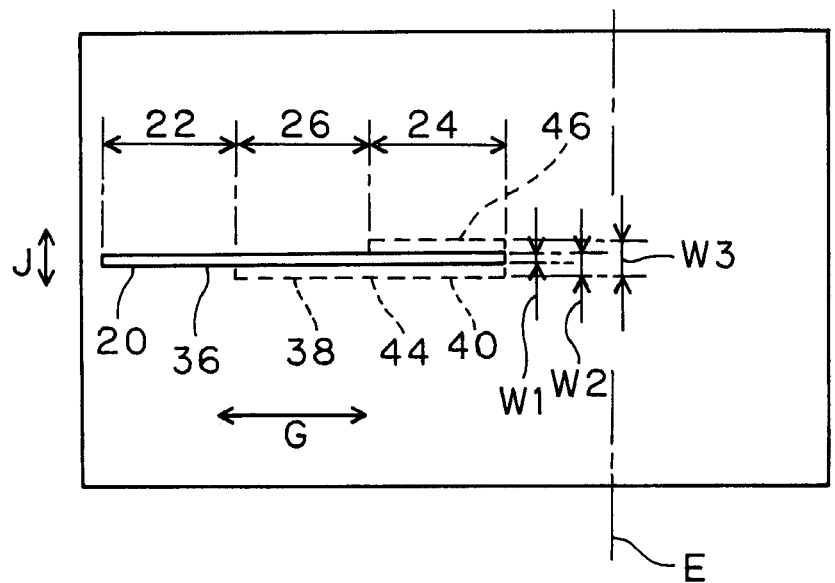
FIG. 5 is a plan view of a block according to Second Embodiment.

FIG. 5 is a plan view showing a block according to Second Embodiment. In this exemplary embodiment, the configuration of the third sipe part 40 is different from that in the foregoing First Embodiment. That is, in this exemplary embodiment, the third sipe part 40 is formed of the second wide part 46 projecting toward a different side of the sipe width direction J from the first wide part 44 relative to the second sipe part 38 so as to have a groove width larger than that of the second sipe part 38. Other configurations are the same as those in First Embodiment, and the same functions and effects are brought.

Third Embodiment

Figure 6:
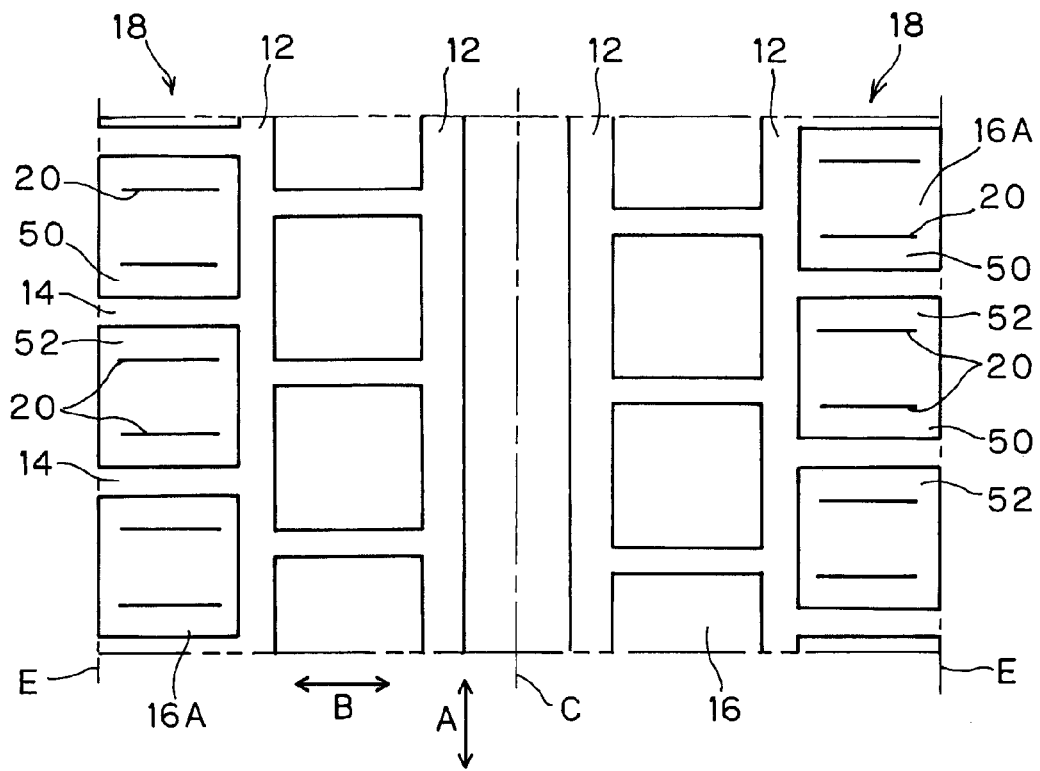
FIG. 6 is a development showing a tread pattern of a tire according to Third Embodiment.
Figure 7:
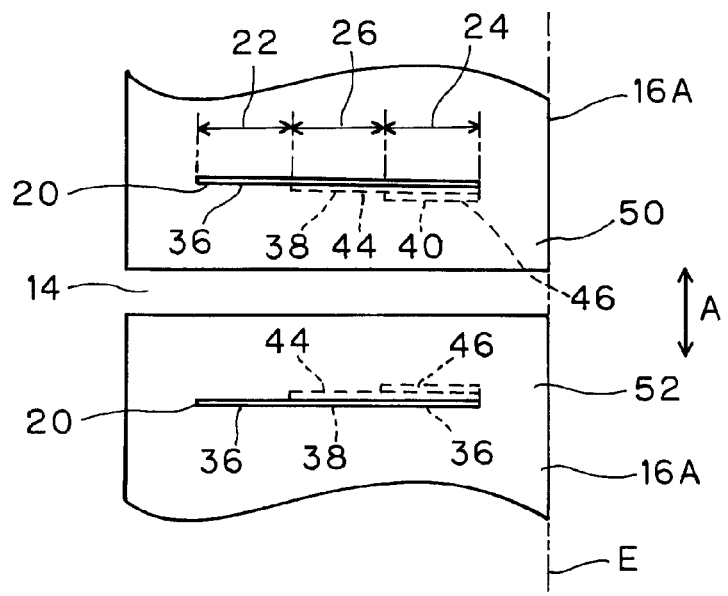
FIG. 7 is a plan view of a block according to Third Embodiment.

FIG. 6 shows a tread pattern of a tire according to Third Embodiment, and FIG. 7 is a view enlargedly showing a block thereof. In this exemplary embodiment, the sipe 20 is provided in each of a tread-in side part 50 and a kick-out side part 52 in the plural blocks 16A provided in the shoulder region 18.

That is, in this exemplary embodiment, the sipe 20 is provided in each of the tread-in side part 50 on one end side and the kick-out side part 52 on the other end side of the tire circumferential direction A in the respective shoulder block 16. As shown in FIG. 7, the sipe 20 provided in the tread-in side part 50 and the sipe 20 provided in the kick-out side part 52 are provided across the transverse groove 14 in such a manner that the sides on which the first and second wide parts 44 and 46 are faced to other. Incidentally, conversely, as for the pair of sipes 20 disposed on the tread-in side and the kick-out side of the transverse groove 14, the sides on which the first and second wide parts 44 and 46 are not provided may be provided in a face-to-face manner, or the sides on which the first and second wide parts 44 and 46 are provided may be provided facing to the same direction in the tire circumferential direction A.

As for Third Embodiment, other configurations are the same as those in First Embodiment, and the same functions and effects are brought. Then, in particular, in Third Embodiment, the pair of sipes 20 can be utilized as an indicator of toe-and-heel wear. Incidentally, in that case, as in the exemplary embodiment shown in FIG. 6, the sipe 20 may be provided in each of the tread-in side part 50 and the kick-out side part 52 of the respective block 16A. Alternatively, for example, by providing every one sipe 20 in the respective block 16A, these sipes 20 may be provided in the tread-in side part 50 and the kick-out side part 52 across the transverse groove 14 between the adjacent blocks.

Other Embodiments

In the foregoing embodiments, the sipes 20 are provided in parallel in the tire width direction B. However, so far as the sipes 20 extend toward the tire width direction B, the sipes 20 may be a sipe extending inclined against the width direction B. Also, in the foregoing embodiments, the sipes 20 are a closed sipe, the both sides of which are plugged. However, the sipes 20 may be a sipe in which an end part of the side of the tire equator C is opened against the transverse groove 14.

Also, in the foregoing embodiments, the wear stage is configured to include three stages by providing the single second sipe part 38 between the first sipe part 36 and the third sipe part 40. However, the wear stage may be configured to include four or more stages by providing a plurality of the second sipe parts.

Also, in the foregoing embodiments, the sipe 20 is provided in all of the shoulder blocks 16A. However, it is not always necessary to provide all of the shoulder blocks 16A. Also, in the foregoing embodiments, the exemplary embodiments in which a block row is formed in the shoulder region 22 have been described. However, it should not be construed that the invention is limited to the case of such a block row, and the tire may be configured by providing the same sipes 20 in a rib that is a continuous land part in the tire circumferential direction A (namely, a shoulder rib). While others are not enumerated one by one, various modifications can be made so far as the gist of the invention is not deviated.

EXAMPLES

Figure 8A:
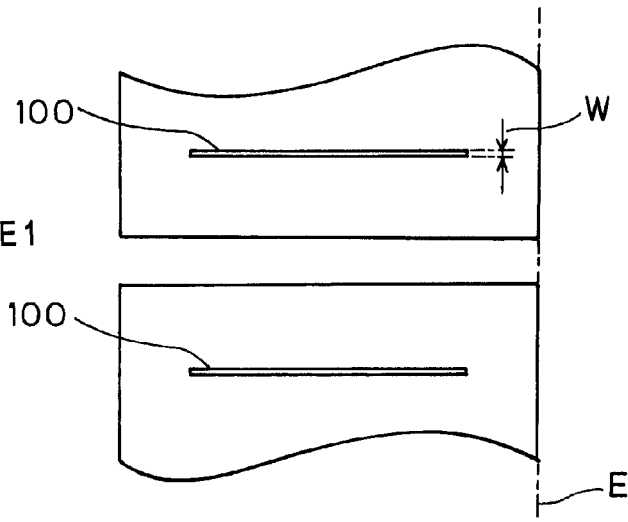
FIGS. 8A to 8C are each a plan view of a block in each of COMPARATIVE EXAMPLES.
Figure 8B:
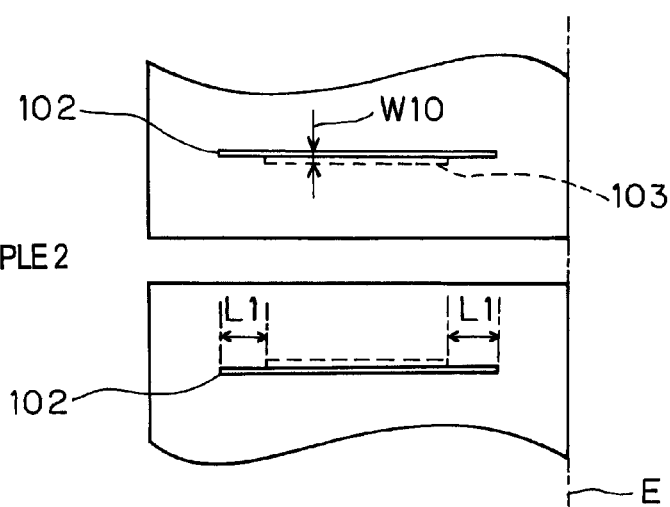
Figure 8C:
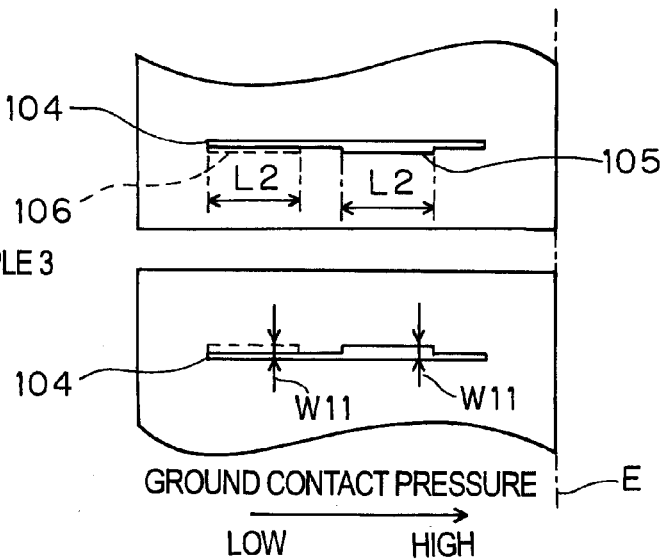

Each of a pneumatic radial tire having a tread pattern of Third Embodiment shown in FIGS. 6 and 7 as EXAMPLE and pneumatic radial tires having tread patterns as COMPARATIVE EXAMPLES 1 to 3 shown in FIGS. 8A to 8C was made on an experimental basis and evaluated with respect to a wear performance and a wet braking performance.

Each size of the sipe 20 in the tire of EXAMPLE is as follows. Sipe full length L=24 mm, sipe depth D=6 mm, first groove width W1=0.3 mm, second groove width W2=0.6 mm, and third groove width W3=0.9 mm. A width of each of the regions in the sipe length direction G is 8 mm for the inner region 22, 8 mm for the central region 26 and 8 mm for the outer region 24. A depth of each of the regions in the sipe depth direction H is 2 mm for the opening side region 30, 2 mm for the central depth region 34 and 2 mm for the bottom part region 32.

A sipe 100 of COMPARATIVE EXAMPLE 1 is concerned with an example in which in the sipe 20 of EXAMPLE, the first and second wide parts 44 and 46 are not provided, and the groove width W is 0.3 mm and is constant in the sipe length direction and depth direction.

A sipe 102 of COMPARATIVE EXAMPLE 2 is concerned with an example in which in the sipe 100 of COMPARATIVE EXAMPLE 1, a wide part 103 starting from a position in the depth direction by 2 mm from the tread surface and extending to the sipe bottom part is provided. The wide part 103 terminates at a position coming inwardly from the end part of the sipe 102 by L1=6 mm. In the wide part 103, a sipe width W10 was set to 0.6 mm.

A sipe 104 of COMPARATIVE EXAMPLE 3 is concerned with an example in which in the sipe 100 of COMPARATIVE EXAMPLE 1, an upper wide part 105 plugged on the way (height: 3 mm) extending from the tread surface in the depth direction and a lower wide part 106 positioning on the tread ground contact end side as compared with the wide part 105 and extending from the same height as the bottom part of the wide part 105 to the sipe bottom part are provided. A length L2 of each of the wide parts 105 and 106 was set to 8 mm, and a sipe width W11 of each of the wide parts 105 and 106 was set to 0.6 mm.

Four wheels of tires having a tire size of 195/65R15 and a rim size of 15×6 were installed in a 2,000-cc class automobile (FF-sedan) (air pressure: 210 kPa), and the performance evaluation was carried out. The evaluation methods are as follows.

Wear Performance

A toe-and-heel wear amount of the tire shoulder block 16A at the time of running of 8,000 km on an asphalted road was measured, and a reciprocal of the wear amount was expressed as an index while defining a value of COMPARATIVE EXAMPLE 1 as 100. It is meant that the larger the numerical value, the smaller the toe-and-heel wear amount and the more excellent the wear performance. The "toe-and-heel wear amount" is a difference between a tread-in side wear amount and a kick-out side wear amount between the adjacent blocks.

Wet Braking Performance

The wet braking performance was evaluated on a wet road (on an asphalt road at a water depth of 1 mm) by measuring a braking distance when ABS was actuated by applying a braking force from the time of a speed of 100 km/h, thereby reducing the speed to a speed of 20 km/h. The evaluation was made at the time of a new article of tire and at the time of 70% wear. The results are shown as an index with respect to a reciprocal of a braking distance while defining a value of COMPARATIVE EXAMPLE 1 as 100. It is meant that the larger the numerical value, the shorter the braking distance and the more excellent the wet braking performance. Incidentally, at the time of 70% wear, the tire of EXAMPLE lies in the third wear stage.

The results are shown in the following Table 1. In the tires of COMPARATIVE EXAMPLE 2 and COMPARATIVE EXAMPLE 3 in which the wide part different from that in the invention was added relative to the sipe shape of COMPARATIVE EXAMPLE 1 that is a conventional example, improvement effects were not substantially observed in the wear performance and wet braking performance. On the other hand, in the tire according to EXAMPLE, an excellent wet braking performance was revealed not only at the beginning of wear but at the end of wear. Also, in the tire according to EXAMPLE, uneven wear of the toe-and-heel was suppressed, and an excellent wear performance was revealed.

TABLE 1

|  | COMPARATIVE EXAMPLE 1 | COMPARATIVE EXAMPLE 2 | COMPARATIVE EXAMPLE 3 | EXAMPLE |
|---|---|---|---|---|
| Sipe configuration | FIG. 8A | FIG. 8B | FIG. 8C | FIG. 7 |
| Wear performance | 100 | 103 | 102 | 110 |
| Wet performance |  |  |  |  |
| At the time of new article | 100 | 103 | 98 | 109 |
| At the time of 70% wear | 100 | 103 | 102 | 109 |

As stated above, according to the pneumatic tire of the embodiments of the invention, the ground contact pressure on the ground contact end side within the shoulder region can be decreased from the beginning of wear to the end of wear, and the ground contact properties tend to become uniform, so that a braking performance and a wear performance can be enhanced. Also, the groove width is set in such a manner that at the time of wear, especially at the end of wear when drainage properties due to a main groove are lowered, the groove width becomes larger in the outer region in the sipe length direction, and therefore, a lowering of the drainage properties can be suppressed.

What is claimed is:

1. A pneumatic tire comprising a sipe extending in a tire width direction provided in a land part located in a shoulder region of a tread part, wherein the sipe comprises:

a first sipe part formed over the whole of a sipe length direction in a region on the opening side in a sipe depth direction and also formed over the whole of the sipe depth direction in an inner region on the tire equator side in the sipe length direction and having a first groove width;

a third sipe part formed in a bottom part region in the sipe depth direction in an outer region on the tread ground contact end side in the sipe length direction and having a third groove width wider than the first groove width; and a second sipe part formed in a region between the first sipe part and the third sipe part and having a second groove width wider than the first groove width and narrower than the third groove width.

2. The pneumatic tire according to claim 1, wherein when a region between the inner region and the outer region in the sipe length direction is defined as a central region, and a region between the region on the opening side and the bottom part region in the sipe depth direction is defined as a central depth region, the second sipe part is formed in the central region and the outer region of the sipe length direction in the central depth region and in the central region of the sipe length direction in the bottom part region.

3. The pneumatic tire according to claim 2, wherein the second sipe part is provided adjacent on the tire equator side and the sipe opening side of the third sipe part, and the first sipe part is provided adjacent on the tire equator side and the sipe opening side of the second sipe part.

4. The pneumatic tire according to claim 1, wherein the second sipe part is formed so as to have a groove width larger than the first sipe part by a first wide part projecting toward one side of the sipe width direction relative to the first sipe part; and the third sipe part is formed so as to have a groove width larger than the second sipe part by a second wide part projecting toward the same side as the first wide part relative to the second sipe part.

5. The pneumatic tire according to claim 1, wherein the second sipe part is formed so as to have a groove width larger than the first sipe part by a first wide part projecting toward one side of the sipe width direction relative to the first sipe part; and the third sipe part is formed so as to have a groove width larger than the second sipe part by a second wide part projecting toward a different side from the first wide part relative to the second sipe part.

6. The pneumatic tire according to claim 1, wherein the sipe is provided in each of a tread-in side part and a kick-out side part in the blocks provided in the shoulder region.

7. The pneumatic tire according to claim 1, wherein the sipe is a closed sipe, both ends of which terminate within the land part.

* * * * *